(12) United States Patent
Huang

(10) Patent No.: US 7,343,503 B2
(45) Date of Patent: Mar. 11, 2008

(54) SYSTEM FOR SUPPLYING OPERATING VOLTAGE TO CPU

(75) Inventor: Tao Huang, Shen-Zhen (CN)

(73) Assignees: Hing Fu Jin Precision Industry (Shenzhen) Co., Ltd., Hao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 392 days.

(21) Appl. No.: 11/110,473

(22) Filed: Apr. 20, 2005

(65) Prior Publication Data

US 2005/0280391 A1     Dec. 22, 2005

(30) Foreign Application Priority Data

May 19, 2004   (CN)   .................. 2004 1 0027365

(51) Int. Cl.
*G06F 1/26*  (2006.01)
(52) U.S. Cl. ................. 713/320; 713/300; 713/340
(58) Field of Classification Search ............... 713/300, 713/320, 340
See application file for complete search history.

(56) References Cited

U.S. PATENT DOCUMENTS

| | | | |
|---|---|---|---|
| 5,414,441 A * | 5/1995 | Memarzadeh et al. | 345/87 |
| 5,774,734 A | 6/1998 | Kikinis et al. | |
| 5,969,512 A * | 10/1999 | Matsuyama | 323/272 |
| 7,134,030 B2 * | 11/2006 | Wang | 713/320 |

FOREIGN PATENT DOCUMENTS

| | | |
|---|---|---|
| CN | 1407714 A | 4/2003 |
| CN | 02130524.2 | 2/2004 |
| JP | 2004-112892 A | 4/2004 |

* cited by examiner

*Primary Examiner*—Thomas Lee
*Assistant Examiner*—Malcolm D Cribbs
(74) *Attorney, Agent, or Firm*—Morris Manning Martin LLP; Tim Tingkang Xia, Esq.

(57) ABSTRACT

A system for supplying an operating voltage to a CPU (50) includes a power supply (10) for supplying power to a computer, a PWM controller (30), a feedback circuit (70), and a plurality of electronic elements. The PWM controller converts voltage supplied to the computer to an operating voltage of the CPU. The feedback circuit comprises a plurality of resistors and capacitors, and feeds back a feedback voltage to the PWM controller. The feedback circuit further includes a thermistor. When resistance of the resistors is changed due to surrounding temperature changing, the thermistor equalizes the resistance changing.

13 Claims, 2 Drawing Sheets

SYSTEM FOR SUPPLYING OPERATING VOLTAGE TO CPU

BACKGROUND OF THE INVENTION

1. Field of the Invention

The present invention relates to a system for supplying operating voltage to a center processing unit (CPU), and particularly to a system for supplying operating voltage to a CPU which is not affected by surrounding temperature of a motherboard.

2. General Background

A CPU is the most important component in a computer as a control center for controlling operation of the computer. When the computer begins to run, the CPU reads data from a memory, and computes a plurality of results bases on the data, then transmits the results to the memory. Also, the CPU controls a motherboard to communicate with external devices for receiving data outside the computer.

Like other electronic components on a motherboard, the CPU must work with an operating voltage which is supplied by the motherboard. Because deferent kinds of CPUs have deferent operating voltages, so a particular power supply circuit is set on the motherboard for supplying an operating voltage suits for the CPU. FIG. 2 shows a power supply circuit for supplying an operating voltage to the CPU. The power supply circuit converts direct current (DC) voltage supplied by a power supply of the computer to an operating voltage suitable for the CPU. The power supply circuit includes a Pulse Width Modulation (PWM) controller. An output terminal of the PWM controller is connected to a feedback circuit. The PWM controller outputs an output voltage to the feedback circuit via the output terminal, and receives a feedback voltage from the feedback circuit. The PWM controller compares the feedback voltage with a reference voltage, and converts the output voltage to a suitable voltage for the CPU.

Conventionally, the feedback circuit includes a plurality of resistors. When the computer is running, surrounding temperature of the motherboard increases due to thermal affect of current. The increasing of temperature causes resistance of the resistors to change. The feedback voltage passes through the resistors, and changes due to the changing of resistance of resistors. The PWM controller receives an inexact feedback voltage, and can't control the output voltage correctly. So the CPU is operating on an incorrect voltage.

What is needed is a system for supplying operating voltage to a CPU which is not affected by surrounding temperature of a motherboard.

SUMMARY

A system for supplying an operating voltage to a CPU includes a power supply for supplying power to a computer, a PWM controller, a feedback circuit, and a plurality of electronic elements. The PWM controller converts voltage supplied to the computer to the operating voltage of the CPU. The feedback circuit includes a plurality of resistors and capacitors, and feeds back a feedback voltage to the PWM controller. The feedback circuit further includes a thermistor. When resistance of the resistors is changed due to surrounding temperature changing, the thermistor equalizes the resistance changing.

It is of advantage that the thermistor equalizes the value changing of the resistors in the feedback circuit. So when the surrounding temperature is increasing, the feedback voltage does not change. Therefore, The PWM controller can control the output voltage correctly despite the surrounding temperature changing.

Other objects, advantages and novel features of the invention will become more apparent from the following detailed description when taken in conjunction with the accompanying drawings, in which:

DETAILED DESCRIPTION OF THE PREFERRED EMBODIMENT

Figure 1:
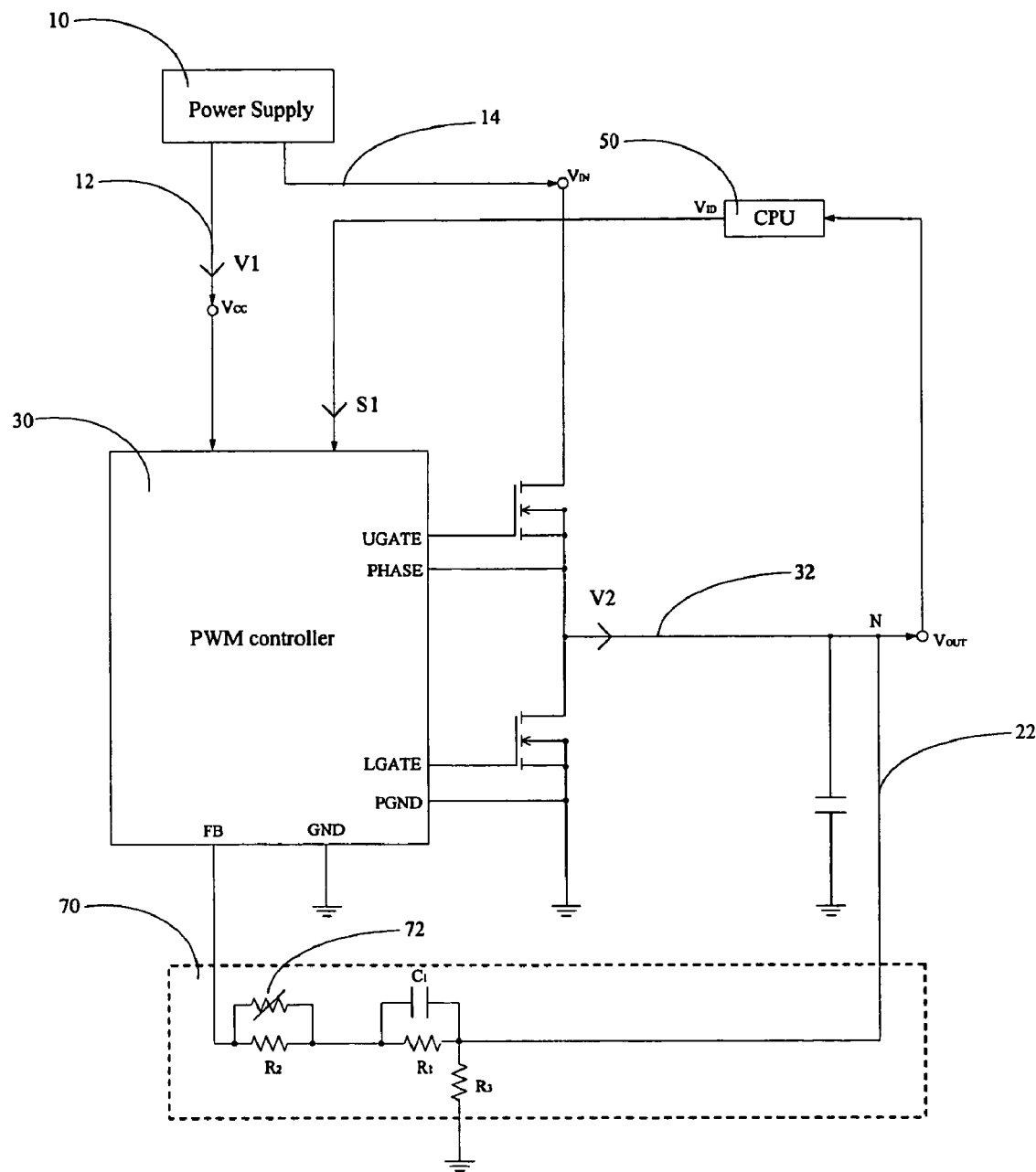
FIG. 1 is a diagram of a circuit system for supplying operating voltage to a CPU in accordance with a preferred embodiment of the present invention.
Figure 2:
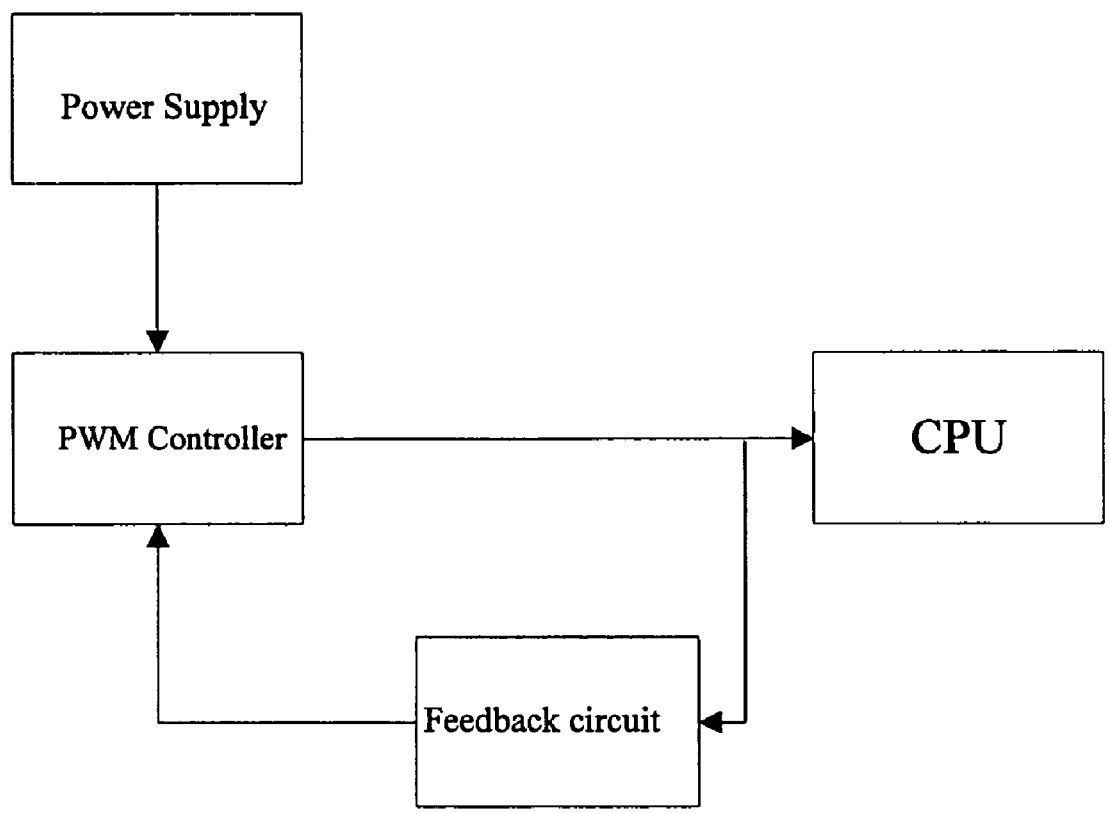
FIG. 2 is a diagram of a conventional system for supplying operating voltage to a CPU.

FIG. 1 shows a system for supplying an operating voltage to a CPU. The system includes a power supply 10, a PWM controller 30, a CPU 50, a feedback circuit 70, and a plurality of electronic elements R1, R2, R3 and C1 for instance.

The power supply 10 converts external alternating current (AC) power to direct current (DC) power, and supplies the DC power to all modules of a computer. An output terminal 12 of the power supply 10 is connected to a Vcc pin of the PWM controller 30 to supply power to the PWM controller 30 to make the PWM controller 30 operating. Another output terminal 14 of the power supply 10 is connected to a UGATE pin and a PHASE pin of the PWM controller 30. The output terminal 14 transmits a voltage V1 to the PWM controller 30 to supply power to devices like the CPU 50 or a south bridge chipset on the motherboard. The PWM controller 30 receives the voltage V1 as an input voltage, and converts the voltage V1 to different voltage suiting for the other devices.

The PWM controller 30 receives a signal S1 from a VID pin of the CPU 50 for identifying a rated voltage of the CPU 50. Then the PWM controller 30 converts the voltage V1 to an output voltage V2 which has a value equal to the rated voltage of the CPU 50, and transmits the output voltage V2 to the CPU 50 through an output terminal 32. A GND pin and a PGND pin of the PWM controller 30 are connected to the ground. A LGATE pin and the PGND pin connect together to the output terminal 32. The output terminal 32 includes a node N. A feedback circuit 70 is connected to a FB pin of the PWM controller via the node N. A feedback voltage is transmitted from the feedback circuit 70 to the FB pin as a feedback signal. Through the feedback voltage, the PWM controller 30 gets the output voltage V2, and compares the output voltage V2 to the rated voltage of the CPU 50. If the output voltage V2 is lower than the rated voltage, the PWM controller 30 raises the output voltage V2 to a higher value, otherwise the PWM controller 30 lowers the output voltage V2 to a lower value.

The feedback circuit 70 includes a plurality of resistors R1, R2, R3, and a plurality of capacitors like C1. Layout of the resistors and capacitors changes basing on different kinds of circuit design. The feedback circuit further includes a thermistor 72. The thermistor 72 is in parallel connection with the resistor R2, and resistance of the thermistor 72 is decreasing when surrounding temperature increases.

When the computer begins to work, the PWM controller 30 receives the signal S1 from the CPU 50, and identifies the rated voltage of the CPU 50. Then the PWM controller 30 receives the voltage V1 from the power supply 10, and outputs the output voltage V2 to the CPU 50. When the value of the output voltage V2 changes, the PWM controller 30 adjusts the output voltage V2 bases on the feedback voltage, and keeps the output voltage V2 around the rated voltage of the CPU 50.

When the working time of computer is increasing, surrounding temperature of a motherboard increases due to thermal affect of current. The increasing temperature causes resistances of the resistors R1, R2 to other greater values. The feedback voltage passes through the resistors R1, R2, and changes due to the changing of resistances of resistors R1, R2. The PWM controller 30 receives an inexact feedback signal, and can't control the output voltage correctly. With effect of the thermistor 72 (resistance of thermistor 72 is denoted as Rt), a total resistance of the resistor R2 and the thermistor 72 is denoted as "R", then:

$$R=1/(1/R2+1/Rt); (Rt \text{ denotes resistance of the thermsitor 72})$$

Because the resistance Rt of the thermistor 72 is decreasing when surrounding temperature increases. As per the above equation, the resistance R will increase due to the increasing of the resistance Rt. The decreasing of resistance of thermistor 72 equalized the increasing of resistances of the resistor R1, R2. The feedback signal does not change when passing through the feedback circuit. So the PWM controller 30 can receive an exact feedback signal, and controls the output voltage correctly.

It is believed that the present embodiment and its advantages will be understood from the foregoing description, and it will be apparent that various changes may be made thereto without departing from the spirit and scope of the invention or sacrificing all of its material advantages, the examples hereinbefore described merely being preferred or exemplary embodiments.

I claim:

1. A system for supplying an operating voltage to a Center Processing Unit (CPU) comprising:
   a power supply for supplying an original voltage to the CPU;
   a Pulse Width Modulation (PWM) controller for converting the original voltage to an operating voltage suitable for the CPU, the PWM controller comprising a Vcc pin for receiving power from the power supply, a UGATE pin connected to a gate of a first transistor, an LGATE pin connected to a gate of a second transistor, a drain of the first transistor connected to the power supply, a source of the first transistor connected to a drain of the second resistor, a source of the second resistor being grounded, a node between the source of the first resistor and the drain of the second resistor acting as an output terminal of the PWM controller and connected to the CPU;
   a feedback circuit connected between the output terminal and an FB pin of the PWM controller for feeding an output signal of the PWM controller back to the PWM controller, the feedback circuit comprises at least one resistor, and a thermistor connected in parallel with said at least one resistor for equalizing resistance changing of said at least one resistor.

2. The system as claimed in claim 1, wherein the feedback circuit further comprises another resistor connected in series with said at least one resistor, and at least one capacitor connected in parallel with said another resistor.

3. The system as claimed in claim 1, wherein resistance of the thermistor is decreasing when surrounding temperature increases.

4. A method for supplying an operating voltage to a Center Processing Unit (CPU), comprising:
   providing a power supply for supplying an original voltage to the CPU;
   connecting a Vcc pin of a Pulse Width Modulation (PWM) controller to the power supply for receiving the original voltage, the PWM controller comprising a UGATE pin connected to a gate of a first transistor, an LGATE pin connected to a gate of a second transistor, a drain of the first transistor connected to the power supply, a source of the first transistor connected to a drain of the second resistor, a source of the second resistor being grounded, a node between the source of the first resistor and the drain of the second resistor acting as an output terminal of the PWM controller and connected to the CPU, the PWM controller converting the original voltage to an operating voltage suitable for the CPU;
   providing a feedback circuit for feeding an output signal of the PWM controller back to an FB pin of the PWM controller, the feedback circuit comprises at least one resistor, and
   providing a thermistor for equalizing resistances changing of said at least one resistor.

5. The system as claimed in claim 4, wherein the feedback circuit further comprises another resistor connected in series with said at least one resistor, and at least one capacitor connected in parallel with said another resistor.

6. The system as claimed in claim 4, wherein resistance of the thermistor is decreasing when surrounding temperature increases.

7. The system as claimed in claim 5, wherein the thermistor is in parallel connection with said at least one resistor of the feedback circuit.

8. A system for supplying power to a voltage-sensitive component, comprising:
   a power supply for supplying available power to said system;
   a controller electrically connected to said power supply and said voltage-sensitive component, and being capable of converting voltages of said available power to a predetermined voltage value acceptable to said voltage-sensitive component, said controller comprising a Vcc pin for receiving said available power from said power supply, a UGATE pin electrically connected to a first transistor, an LGATE pin electrically connected to a second transistor, said first transistor electrically connected to said second resistor, a node between said first resistor and said second resistor acting as an output terminal of said controller and electrically connected to said voltage-sensitive component; and
   a temperature-sensitive component electrically connected to an FB pin of said controller and used to provide a comparable signal to said controller based on temperature changes around said temperature-sensitive component so as to contribute to maintenance of voltage-conversion of said controller to said predetermined voltage value.

9. The system as claimed in claim 8, wherein said temperature-sensitive component is a thermistor of a feedback circuit electrically connected to said controller to provide said comparable signal to said controller.

10. The system as claimed in claim 8, wherein said controller is a Pulse Width Modulation (PWM) controller.

11. The system as claimed in claim 8, wherein said UGATE pin of said controller is electrically connected to a gate of said first transistor, said LGATE pin of said controller is electrically connected to a gate of said second transistor, a drain of said first transistor is electrically connected to said power supply, a source of said first transistor is electrically connected to a drain of said second resistor, and a source of said second resistor is grounded.

12. The system as claimed in claim 8, wherein said temperature-sensitive component is electrically connected between said FB pin of said controller and said node between said first resistor and said second resistor.

13. The system as claimed in claim 8, further comprises a first resistor electrically connected in parallel with said temperature-sensitive component, a second resistor electrically connected in series with said first resistor, and at least one capacitor electrically connected in parallel with said second resistor.

* * * * *